(No Model.)
B. ELMORE.
MOTOR.
No. 347,479. Patented Aug. 17, 1886.
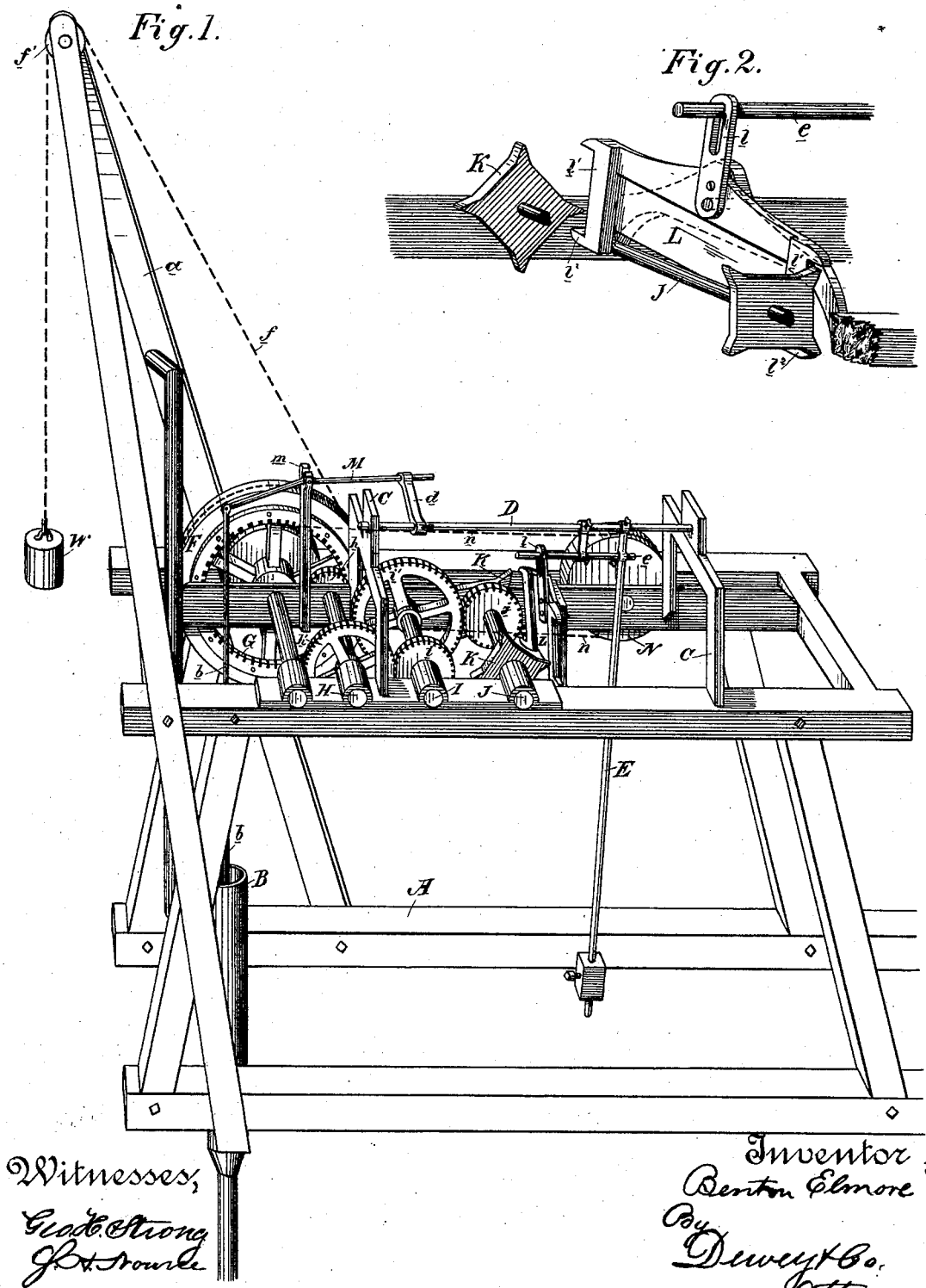
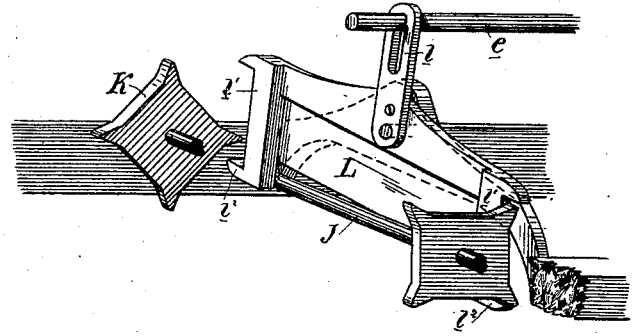
Witnesses:
Geo. H. Strong
J. H. Trowle
Inventor,
Benton Elmore
By
Dewey & Co.
Attys

UNITED STATES PATENT OFFICE.

BENTON ELMORE, OF REDDING, CALIFORNIA, ASSIGNOR OF ONE-HALF TO FRED GROTEFEND, OF SAME PLACE.

MOTOR.

SPECIFICATION forming part of Letters Patent No. 347,479, dated August 17, 1886.

Application filed March 9, 1886. Serial No. 194,643. (No model.)

*To all whom it may concern:*

Be it known that I, BENTON ELMORE, of Redding, Shasta county, State of California, have invented an Improved Motor; and I hereby declare the following to be a full, clear, and exact description of the same.

My invention relates to the class of apparatus for operating various machinery, but especially for working pumps, in which connection I will herein illustrate it.

My invention consists in the general arrangement of a swinging pendulum, a suspended weight for developing the power, and power-transmitting gears between the weight and pendulum.

It consists, further, in the novel connection between the pendulum and the pump-pitman, and in the peculiar mechanism by which the power of the gears is transmitted to the pendulum, all of which I shall hereinafter fully describe.

The object of my invention is to provide a simple, practicable, and effective power mechanism for driving such machinery as pumps, &c.

Referring to the accompanying drawings for a more complete explanation of my invention, Figure 1 is a perspective view of my power mechanism. Fig. 2 is a perspective detail of the mechanism by which the power of the gearing is transmitted to the pendulum.

A is the frame-work, located over the well or other water source.

B is a pump supported by the frame-work, and having a pitman, $b$. In the top of the frame-work are standards C, in which is journaled a shaft, D, from which the pendulum E is suspended, and to which it is attached. The shaft has a crank, $d$.

F is a large drum, upon which is secured and winds and unwinds a cord or cable, $f$, which passes up over the pulley $f'$ in a standard, $a$, of the main frame, and suspends a weight, W. The inner face of the drum F has a band of cogs, G.

H is a cross-shaft, having a pinion, $h$, which meshes with the cogs G, and a large gear, $h'$, upon its other end. The pinion $h$ may be secured on its shaft by a key, (not shown,) the removal of which loosens the pinion, so that the drum may be rewound.

I is a cross-shaft, having a pinion, $i$, meshing with the large gear $h'$, and having a large gear, $i'$, on its other end.

J is a shaft, having a pinion, $j$, with which the large gear $i'$ engages. On the ends of this shaft J are two toothed wheels or cranks, K. The teeth of one wheel alternate with those of the other, so that their action is alternate.

L is a centrally-pivoted lever, having an upwardly-extending slotted arm, $l$, and downwardly-extending end arms, $l'$, provided with short lugs $l^2$, which the teeth of the wheels K strike. The upper end of the pendulum is provided with an arm, $e$, at right angles, and with which the slotted arm $l$ of the centrally-pivoted lever L engages.

M is a lever, pivoted at $m$, and connected at one end with the pump-pitman and at the other end with the crank $d$ of the shaft D.

N is a drum or roller, to which is secured a cord or cable, $n$, the other end of which is secured to the large drum F, and is adapted to wind thereon in a reverse manner to the cord or cable $f$, which suspends the weight W.

The operation of the apparatus is as follows: The suspended weight causes the rotation of the large drum F, which, through its cogs G and the various pinions, shafts, and gears described, transmits power to the shaft J, whereby the toothed wheels or cranks K are rotated. These, coming in contact alternately with the lugs $l^2$ of the downwardly-extending arms $l'$ of the lever L cause said lever to oscillate, and thus, through its slotted arm $l'$ and the arm $e$, cause the continued vibration of the pendulum. The vibration of the pendulum effects the oscillation of the shaft D, which, through its crank $d$ and the pivoted lever M, reciprocates vertically the pitman $b$ of the pump. This operation is continued until the weight reaches a point of rest. The drum F, in paying out the suspending-cord of the weight, winds up the other cord, $n$, and therefore at the end of the operation, by rotating the drum N, the main drum F may be reversed, and thus wind up the weight again.

I am aware that it is not new to use clockwork mechanism for operating various machinery, and do not claim such, broadly, but confine myself, as far as the clock-work is concerned, to its general arrangement.

The power mechanism between the clockwork gearing and the pendulum is simple and effective, the toothed wheels or cranks K being direct in their action and furnishing ample power for continuing the vibration of the pendulum. The pendulum is provided with the vertically-adjustable weight P, whereby its stroke may be varied. I can apply this power apparatus to mechanisms other than pumps; but I need not describe them here, as the pump is sufficient to illustrate the apparatus.

Having thus described my invention, what I claim as new, and desire to secure by Letters Patent, is—

1. The swinging pendulum E and a connection between it and the mechanism to be operated, in combination with the weight W, the drum F, from which it is suspended, and which is rotated thereby, the gear-band G on the drum, the shaft H, the pinion $h$ on the shaft, meshing with the gear-band on the drum, the gear $h'$ on the said shaft, the shaft I, the pinion $i$ of the shaft, with which gear $h'$ engages, the gear $i'$ on shaft I, and a connection between said gear $i'$ and the pendulum, by which the latter is vibrated, substantially as herein described.

2. The frame-work A, having standard $a$, with pulley $f'$, the pendulum E, suspended from the frame, and a connection between the pendulum and the mechanism to be operated, in combination with the drum F, mounted in the top of the frame, the weight W, suspended from and operating the drum by the cord $f$, guided by pulley $f'$, the gear-band G on the drum, the shaft H, the pinion $h$ on the shaft, meshing with the gear-band on the drum, the gear $h'$ on said shaft, the shaft I, the pinion $i$ on the shaft, with which the gear $h'$ engages, the gear $i'$ on shaft I, and a connection between said gear $i'$ and the pendulum, by which the latter is vibrated, substantially as herein described.

3. The frame-work A, the pendulum E, suspended therefrom, and a connection between the pendulum and the mechanism to be operated, in combination with the drum F, mounted in the top of the frame, the weight W, suspended from and operating the drum, the drum N and the cord $n$, by which the drum F is reversed to wind up the weight, the gear-band G on drum F, and a gear mechanism between the band G and the pendulum, by which the latter is vibrated, substantially as herein described.

4. In a power apparatus, the swinging pendulum E, having an arm, $e$, in combination with the means for oscillating it, consisting of the centrally-pivoted lever L, having a central vertical arm, $l$, slotted on the arm $e$ of the pendulum, and downwardly-extending end arms, $l'$, with lugs $l^2$ on their lower ends, and rotating toothed wheels or cranks K, engaging alternately the lugs $l^2$ on the arms of the lever, substantially as herein described.

5. In a power apparatus, the swinging pendulum E, having an arm, $e$, at right angles thereto, in combination with the centrally-pivoted lever L, having a central vertical arm, $l$, slotted on the arm $e$ of the pendulum, and downwardly-extending end arms, $l'$, with lugs $l^2$ on their lower ends, the rotating shaft J, and the toothed wheels K, or cranks, on the shaft, engaging alternately the lugs on the end arms of lever L, substantially as herein described.

6. In a power apparatus, the swinging pendulum E, an arm, $e$, and a connection between said pendulum and the mechanism to be driven, in combination with the drum F, the weight W, suspended from and operating the drum, the gear-band G on the drum, the shaft H, having pinion $h$ and gear $h'$, the shaft I, having pinion $i$ and gear $i'$, the shaft J, having pinion $j$ and toothed wheels or cranks K, one on each end, and the centrally-pivoted lever L, having an upwardly-extending central arm, $l$, slotted on the arm $e$ of the pendulum, and downwardly-extending end arms, $l'$, with lugs $l^2$, with which the cranks K alternately engage, substantially as herein described.

7. In a power apparatus, the swinging pendulum E, in combination with the means by which power is transmitted to the mechanism to be driven, consisting of the shaft D, from which the pendulum is suspended, and the crank $d$ on the shaft, substantially as herein described.

8. In a power apparatus, the swinging pendulum E, in combination with the oscillating shaft from which it is suspended, the crank $d$ on said shaft, and the pivoted lever M, connected with said crank and mechanism driven, substantially as herein described.

9. The power apparatus consisting of the swinging pendulum E, having arm $e$, and the means by which its power is transmitted, consisting of the oscillating shaft D, crank $d$, and lever M, the drum F, the weight W, suspended therefrom, and the gears, pinions, and shafts by which the rotation of the drum is transmitted, all as described, in combination with the pivoted lever L, having slotted central arm, $l$, engaging the arm $e$ of the pendulum, and end arms, $l'$, and the toothed wheels or cranks K, rotated by the gearing and alternately engaging the end arms of the lever, whereby the vibration of the pendulum is effected, all arranged and adapted to operate substantially as herein described.

In witness whereof I have hereunto set my hand.

BENTON ELMORE.

Witnesses:
S. H. NOURSE,
H. C. LEE.